United States Patent
Kuniyasu et al.

(10) Patent No.: US 8,895,113 B2
(45) Date of Patent: Nov. 25, 2014

(54) METHOD OF MANUFACTURING FILM WITH A COATING LAYER

(75) Inventors: Satoshi Kuniyasu, Minami-Ashigara (JP); Tamotsu Saikawa, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/564,790

(22) Filed: Aug. 2, 2012

(65) Prior Publication Data

US 2013/0034662 A1 Feb. 7, 2013

(30) Foreign Application Priority Data

Aug. 3, 2011 (JP) ................. 2011-170344
Sep. 28, 2011 (JP) ................. 2011-212938
Jul. 20, 2012 (JP) ................. 2012-161616

(51) Int. Cl.
  C08F 2/48 (2006.01)
  C08F 2/46 (2006.01)
  C08J 7/18 (2006.01)
  G02B 1/11 (2006.01)

(52) U.S. Cl.
  CPC ................. *G02B 1/111* (2013.01)
  USPC ............. 427/508; 427/487; 427/595

(58) Field of Classification Search
  CPC .................................. G02B 1/11
  USPC .................................. 427/508
  See application file for complete search history.

(56) References Cited

U.S. PATENT DOCUMENTS

| 5,773,126 A * | 6/1998 | Noritake et al. ............. 428/143 |
| 6,880,954 B2 * | 4/2005 | Ollett et al. .................. 362/245 |
| 7,569,269 B2 * | 8/2009 | Takada et al. ................ 428/323 |
| 7,604,358 B2 * | 10/2009 | Ninomiya et al. ........... 359/601 |
| 2007/0146887 A1 * | 6/2007 | Ikeda et al. .................. 359/586 |
| 2009/0176077 A1 * | 7/2009 | Horio et al. ................. 428/217 |
| 2010/0020398 A1 * | 1/2010 | Horio et al. ................. 359/493 |
| 2010/0062217 A1 * | 3/2010 | Kurematsu .................. 428/141 |

FOREIGN PATENT DOCUMENTS

| JP | 2003-205563 A | 7/2003 |
| JP | 2006-10923 A | 1/2006 |
| JP | 4135364 B2 | 8/2008 |
| JP | 2008-250267 A | 10/2008 |

OTHER PUBLICATIONS

K.C. Wu, K. F. Seefeldt, and M.J. Solomon, J.W. Halloran. Prediction of ceramic stereolithography resin sensitivity from theory and measurement of diffusive photon transport. 2005. Journal of Applied Physics. 98.*

(Continued)

*Primary Examiner* — Dah-Wei D Yuan
*Assistant Examiner* — Kristen A Dagenais
(74) *Attorney, Agent, or Firm* — Birch, Stewart, Kolasch & Birch, LLP

(57) ABSTRACT

A method of manufacturing a film with a coating layer includes a preparing step of preparing a coating liquid containing one or more photopolymerization initiator, a solvent, an actinic-ray curable monomer, and an actinic-ray curable resin, an applying step of applying the coating liquid onto a support to form a coating layer; and a irradiation step of irradiating the coating layer with an actinic ray, wherein in the irradiation step, the coating layer is irradiated with the actinic ray in a state where the coating layer contains the solvent of 10 wt % or more.

7 Claims, 2 Drawing Sheets

(56) References Cited

OTHER PUBLICATIONS

Albatross UV. Intensity. www.albatrossuv.com/UV-Lamp-Intensity.php. Jan. 20, 2008.*
Material Safety Data Sheet. Sceience Lab.com, May 21, 2013.*
K.C. Wu, K.F. Seefeldt, and M.J. Solomon, J.W. Halloran. PRediction of ceramic stereolithography resin sensitivity from theory and measurement of diffusive photon transport. 2005. Journal of Applied Physics. 98.*
Albatross UV. Intensity. www.albatross.com/UV-Lamp-Intensity.php. Jan. 20, 2008.*
Non-Final Office Action dated Mar. 26, 2013 in U.S. Appl. No. 13/594,459.
U.S. Final Office Action dated Sep. 19, 2013 in U.S. Appl. No. 13/594,459.

* cited by examiner

RELATED ART

METHOD OF MANUFACTURING FILM WITH A COATING LAYER

BACKGROUND OF THE INVENTION

1. Field of the Invention

The present invention relates to a method of manufacturing a film with a coating layer and, in particular, to a method of manufacturing a film with a coating layer which is formed by applying a coating liquid containing a solvent onto a support.

2. Description of the Related Art

Conventionally, to prevent surface reflection of a lens, a plastic film, or others, an anti-reflection film is provided on a surface thereof. In recent years, the anti-reflection film is provided on a surface of a liquid-crystal display or a plasma display on a viewing side.

This anti-reflection film may be peeled off or damaged when dust, oil, or the like is wiped off from the surface. To address this problem, a hard coat layer having a thickness of several to several tens of micrometers is provided between the anti-reflection film and a surface base material (hereinafter also simply referred to as a base material) on a viewing side of the display.

It has been known that an anti-abrasion property is improved by providing the hard coat layer under the anti-reflection film.

However, it has also been known that interference fringe (grease-stain-like rainbow-colored unevenness) occurs when the hard coat layer is provided between the base material and the anti-reflection film, disadvantageously resulting in deterioration in visibility of the display. This interference fringe has been known to occur due to interference between light reflected from the surface of the hard coat layer and light reflected from an interface between the hard coat layer and the base material.

To solve this problem of interference fringe, in an optical film manufacturing method described in Japanese Patent No. 4135364, a solvent having a property to dissolve the base material therein and make it swell is used to form discontinuous minute convexo-concave on the interface between the base material and the hard coat layer, thereby making it possible to suppress interference fringe.

SUMMARY OF THE INVENTION

However, in the optical film manufacturing method described in Japanese Patent No. 4135364 mentioned above, the degree of suppression of interference fringe is insufficient. Moreover, as the base material is dissolved and swelled more to weaken interference fringe, the strength of the base material is decreased, thereby sometimes disadvantageously causing the base material to curl or degrade brittleness. In addition, when a coating layer is formed by a coating liquid containing a solvent is applied onto a support, there are sometimes disadvantages that curing wrinkles (wrinkles caused when the coated layer is cured) appear on the coated layer. The curling, degradation of brittleness and curing wrinkles are more serious as the base material is thinner. A thinner material is becoming increasingly popular year by year. Thus, a technology against interference fringe with a new concept has been desired. Further, a technology against curing wrinkles with a new concept has also been desired.

In view of these circumstances, a first aspect of the present invention aims to provide a method of manufacturing a film with a coating layer capable of significantly weakening reflection between a base material (also referred to as a support or a film) and the coating layer and significantly reducing interference fringe owing to this reflection. In addition, in view of these circumstances, a second aspect of the present invention aims to provide a method of manufacturing a film with a coating layer capable of significantly reducing curing wrinkles.

The problems of the present invention can be solved by aspects of the invention described below.

That is, a method of manufacturing a film with a coating layer according to a first aspect of the present invention includes: a preparation step of preparing a coating liquid containing one or more photopolymerization initiators, a solvent, an actinic-ray curable monomer, and an actinic-ray curable resin having one or more types of molecular weights; an application step of applying the coating liquid onto a support into which the solvent can permeate or can be dissolved to form a coating layer; and an irradiation step of irradiating the coating layer with an actinic-ray, wherein the actinic-ray curable resin has a molecular weight of 2500 or more, and the actinic-ray curable resin has a solid content concentration of 3 weight percent or more in the coating liquid, a solid content concentration of total solid content of the solid content in the actinic-ray curable resin and solid content in the actinic-ray curable monomer is 30 weight percent or more in the coating liquid, among the one or more types of actinic-ray curable resins, when an actinic-ray curable resin having a molecular weight of hundred thousand or more has a solid content concentration of A weight percent in the coating liquid and an actinic-ray curable resin having a molecular weight smaller than hundred thousand has a solid content concentration of B weight percent in the coating liquid, B>A≥0, and in the irradiation step, the coating layer is irradiated with the actinic-ray in a state where the coating layer contains the solvent of 10 weight percent or more.

A method of manufacturing a film with a coating layer according to a second aspect of the present invention includes: a preparation step of preparing a coating liquid containing one or more photopolymerization initiators, a solvent, an actinic-ray curable monomer, and an actinic-ray curable resin having one or more types of molecular weights; an application step of applying the coating liquid onto a support into which the solvent can permeate or can be dissolved to form a coating layer; and an irradiation step of irradiating the coating layer with an ultraviolet light (UV light) emitted from a light-emitting diode (LED) light source as an actinic-ray, wherein, in the irradiation step, the coating layer is irradiated with the actinic-ray in a state where the coating layer contains the solvent of 10 weight percent or more.

In the method of manufacturing a film with a coating layer according to the present invention, it is preferable that the actinic-ray is an ultraviolet light and that at least one of the one or more the photopolymerization initiators have a molar absorption coefficient (molar absorptivity) of 500 (1/(mol·cm)) or more at UV light wavelength. This enables to enhance a curing efficiency.

Also, in the method of manufacturing a film with a coating layer according to the aspect of the present invention, in the irradiation step, the coating layer may be irradiated with UV light, as the actinic ray, having an irradiance of 10 mW/cm$^2$ or more and an amount of irradiation of 10 mJ/cm$^2$ or more.

A film with a coating layer capable of significantly weakening reflection of light from the interface between the coating layer and the support can be manufactured.

DETAILED DESCRIPTION OF THE PREFERRED EMBODIMENTS

Figure 1A:
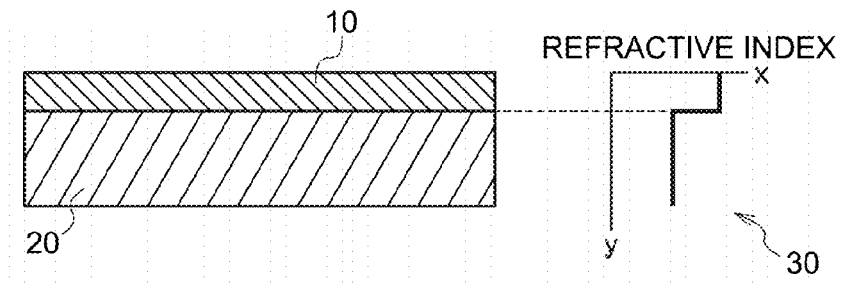
FIGS. 1A to 1D are diagrams each showing a section of a film including a coating layer and a support (film with a coating layer), and a refractive index distribution in that section.

Embodiments for carrying out the present invention are described in detail below with reference to the attached drawings. Here, portions denoted as a same reference numeral are similar components having similar functions. Also, when a range of numerical values is represented by using "-" in the specification, an upper-limit numerical value and a lower-limit numerical value interposing "-" therebetween are also included in the range of numerical values.

General Outline of the Invention

A general outline of the present invention is described in comparison with Japanese Patent No. 4135364 described above. In Japanese Patent No. 4135364 described above, since natural drying is performed after application of a coating liquid, it takes time to evaporate the solvent to increase the viscosity of the coating layer. With this, the solvent (ethyl acetate and methyl ethyl ketone in an example) and an actinic-ray curable monomer (dipentaerythritol hexaacrylate in the example) permeate into the base material.

Figure 1B:
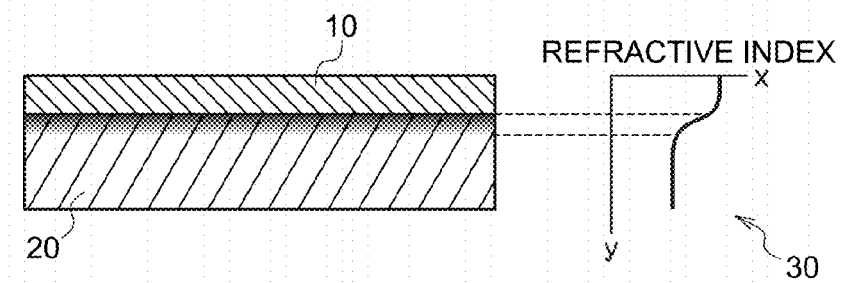
Figure 1C:
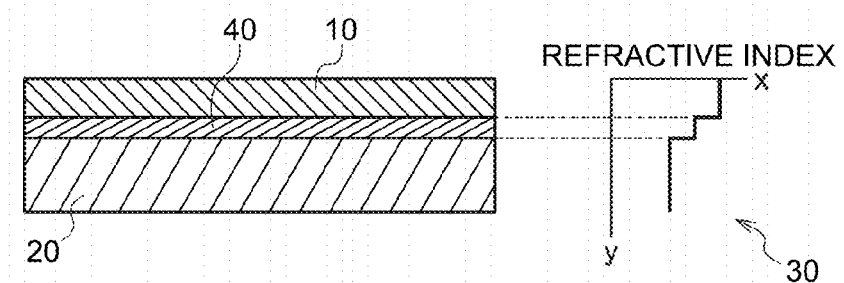
Figure 1D:
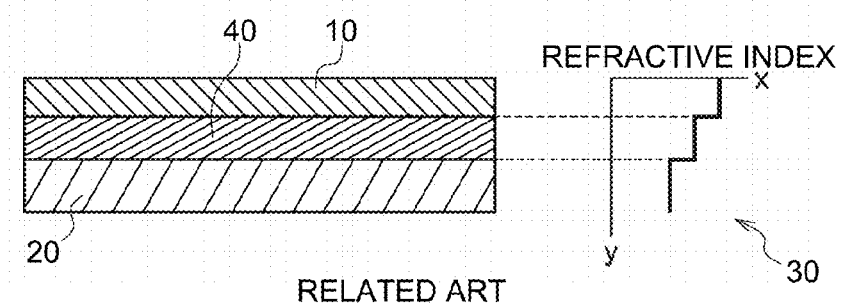

As a result, as shown in FIG. 1D, a material distribution in a layer thickness direction in an intermediate layer 40 becomes substantially uniform, and thus a refractive index distribution becomes substantially uniform in the layer thickness direction in the intermediate layer 40. FIG. 1D is a diagram showing a section of a film with a coating layer manufactured with a conventional method and its refractive index distribution. And, changes of the refractive indexes in a vicinity of an interface between a support 20 and the intermediate layer 40, and in a vicinity of an interface between the intermediate layer 40 and a hard coat layer (a coating layer) 10 become steep. It has turned out that this is the reason why interface unevenness cannot be sufficiently suppressed in Japanese Patent No. 4135364 described above.

Thus, the inventors had aimed to generate a gradient (slope) in the material distribution in the layer thickness direction of the intermediate layer 40.

As a result of diligent studies, the inventors conceived an idea to increase the viscosity by appropriately curing hard coat components in a portion from vicinity of base material to the intermediate layer, immediately after the application of the coating liquid, thereby controlling the permeation speed of the components of a mixture of the solvent and the hard coat through the base material, and decreasing the gradient of the material distribution in the layer thickness direction in the intermediate layer.

However, the inventors confronted an unexpected difficulty that, when the coating liquid only contains an actinic-ray curable monomer as a dissolved substance as in examples of Japanese Patent No. 4135364 described above, the curing reaction of the coating layer hardly proceeds even if actinic ray irradiation is performed immediately after the application of the coating liquid.

Here, the inventors viewed that the reason why the curing reaction of the coating layer hardly proceeds with actinic ray irradiation immediately after the application of coating liquid is that the amount of the solvent is too large in the coating layer immediately after being applied, and thus, a distance between the actinic-ray curably monomers is too much, thereby causing crosslinking points too far away from each other.

According to this view (perception), in order to provide a point where the actinic-ray curable monomers can be crosslinked, a somewhat larger amount of an actinic-ray curable resin with a long molecular chain is mixed into the coating liquid. As a result, the inventors have found that the view is exactly right, allowing the curing of the coating layer to significantly proceed even immediately after being applied.

Processes

A method of manufacturing a film with a coating layer of the present invention is configured to mainly include: a preparation process of preparing a coating liquid containing a solvent, an actinic-ray curable monomer, and an actinic-ray curable resin having a molecular weight of 2500 or more; an application process of applying the coating liquid onto a support into which the solvent can permeate or can be dissolved to form a coating layer; and an irradiation process of irradiating the coating layer with an actinic ray. Here, in the present embodiment, the support and the film means the same.

The coating liquid prepared in the preparation process preferably has the actinic-ray curable resin having the molecular weight of 2500 or more with its concentration of solid contents of 3 weight percent. Also, the coating liquid may contain one type of actinic-ray curable resin or may contain a plurality of actinic-ray curable resins having different molecular weights. However, when an actinic-ray curable resin having a molecular weight of hundred thousand or more is contained, it is required that an actinic-ray curable resin having a molecular weight smaller than hundred thousand is contained, and the actinic-ray curable resin having the molecular weight smaller than hundred thousand is preferably included more in weight ratio than the actinic-ray curable resin having the molecular weight of hundred thousand or more, because it makes the effect of weakening reflection of light larger.

Here, regarding the amounts of the actinic-ray curable resin having the molecular weight smaller than hundred thousand and the actinic-ray curable resin having the molecular weight of hundred thousand or more, the actinic-ray curable resin having the molecular weight of hundred thousand or more is preferably less than 10 weight percent of the actinic-ray curable resin having the molecular weight smaller than hundred thousand, further preferably less than 1 weight percent of the actinic-ray curable resin having the molecular weight smaller than hundred thousand, and most preferably the actinic-ray curable resin having the molecular weight of hundred thousand or more is not contained. This is because the effect of weakening reflection of light is larger as the amount of the actinic-ray curable resin having the molecular weight of hundred thousand or more is smaller. Also, the actinic-ray curable monomer preferably has a concentration of solid contents of 1 weight percent or more.

In the application process, various coating methods can be adopted, such as gravure coating, roll coating, reverse coating, die coating, knife coating, wire bar coating, dip coating, spray coating, air knife coating, and curtain coating.

As a solvent, any can be used as long as it can permeate into the base material. For example, when the base material is made of triacetyl cellulose, preferably usable solvents include chloroform, methylene chloride, tetrahydrofuran, ethyl acetate, methyl acetate, methyl ethyl ketone, phenol, nitrobenzene, chlorophenol, chlorobenzene, and hexafluoroisopropanol.

As an actinic-ray curable monomer, any can be used as long as it has a size allowing permeation through the base material together with the solvent. For example, when the base material is made of triacetyl cellulose, preferably usable actinic-ray curable monomers include (metha)acrylic acid diesters of alkylene glycol such as dipentaerythritol hexaacrylate, neopentyl glycol acrylate, 1,6-hexanediol (metha)acrylate, and propylene glycol di(metha)acrylate; (metha)acrylic acid diesters of polyoxyalkylene glycol such as triethylene glycol di(metha)acrylate, dipropylene glycol di(metha)acrylate, polyethylene glycol di(metha)acrylate, and polypropylene glycol di(metha)acrylate; (metha)acrylic acid diesters of polyalcohol such as pentaerythritol di(metha) acrylate; (metha)acrylic acid diesters of an ethylene oxide additive or a propylene oxide additive such as 2,2-bis{4-(acryloxy.diethoxy)phenyl}propane and 2-2-bis{4-(acryloxy.propoxy)phenyl}propane; polyfunctional monomers such as epoxy(metha)acrylates, urethane(metha)acrylates, and polyester(metha)acrylates; acrylic acid esters such as N-vinylpyrrolidone, ethylacrylate, and propylacrylate; methacrylic acid esters such as ethylmethacrylate, propylmethacrylate, isopropylmethacrylate, butylmethacrylate, hexylmethacrylate, isooctylmethacrylate, 2-hydroxyethylmethacrylate, cyclohexylmethacrylate, and nonylphenylmethacrylate; tetrafurfurylmethacrylate and its derivatives such as a caprolactone-modified one; and a monofunctional monomer such as styrene, α-methylstyrene, acrylic acid and a mixture thereof.

As the monomer, one type among the polyfunctional or monofunctional monomers listed above or a mixture of a plurality of types thereof may be used. To increase the hardness of the coating layer, however, it is preferable to use only a polyfunctional monomer or a monomer with a polyfunctional monomer having a ratio of 80 weight percent or more with respect to the entire monomer for use.

As the actinic-ray curable resin, monofunctional or polyfunctional acrylate, methacrylate, urethane acrylate, and others having a molecular weight of 2500 or more can be used.

Examples of a photo-radical polymerization initiator as a polymerization initiator include acetophenones, benzoins, benzophenons, phosphine oxides, ketals, anthraquinones, thioxanthones, azo composites, peroxides (such as Japanese Patent Application Laid-Open No. 2001-139663), 2,3-dialkyldione composites, disulfide composites, fluoroamine composites, aromatic sulfoniums, lophine dimers, onium salts, borate salts, active esters, active halogens, an inorganic complex, and coumarins.

As the support, TAC (triacetyl cellulose), PET (polyethylene terephthalate), and others can be used, but the solvent has to be able to permeate into the support for use. As a combination of the support and the solvent, for example, when TAC is used for the support, chloroform, methylene chloride, tetrahydrofuran, ethyl acetate, methyl acetate, methyl ethyl ketone, and others can be used as the solvent. When PET is used for the support, phenol, nitrobenzene, chlorophenol, chlorobenzene, hexafluoroisopropanol, and others can be used as the solvent. Here, "able to permeate" means that solute components are contained in (mixed into) the support (film) after drying.

In the irradiation process, the coating layer is preferably irradiated with an actinic ray in a moist state in which the coating layer contains the solvent. This is because a desired gently-sloped refractive index distribution (gently changing refractive index distribution) near the interface between the support and the coating layer cannot be obtained in a too dried state even if irradiating with an actinic ray.

As an actinic ray, an ultraviolet ray, an electromagnetic ray, a particle beam and others can be used, and it is preferable to use an ultraviolet ray. As means of irradiation with an ultraviolet ray, various ultraviolet ray irradiation sources can be adopted, such as a low-pressure mercury lamp, a high-pressure mercury lamp, and an ultrahigh-pressure mercury lamp, and it is preferable to use an LED (Light Emitting Diode) light source. The reason for this is that the LED light source is of a single wavelength and does not cause heat by infrared irradiation, and therefore a solvent gas evaporated from the coating layer can be prevented from catching fire due to heat. Moreover, it is possible to achieve unpredictable effects that curing wrinkles are substantially reduced by using the UV light of the LED light source.

Also, the irradiation process may be performed under an inert gas atmosphere. The reason for this is that oxygen absorbs ultraviolet ray energy to be changed to ozone under an atmosphere where oxygen is present and therefore the ultraviolet ray energy cannot be efficiently transmitted to the polymerization initiator.

Furthermore, for a similar reason, oxygen is preferably removed from the inside of the coating liquid before the application process. With this, oxygen absorbing the ultraviolet ray energy is removed from the inside of the coating layer, and therefore the ultraviolet ray energy can be efficiently transmitted to the polymerization initiator. To remove oxygen from the coating liquid, a method of temporarily placing the coating liquid in a reduced pressure environment can be adopted.

After the manufacturing process according to the present invention, a necessary process can be performed for each product to be fabricated. For example, to fabricate an antireflection film, a hard coat film, or the like, a drying process of evaporating the solvent can be performed after the processes according to the present invention, and further a UV curing process of curing the actinic-ray curable monomer and the actinic-ray curable resin can be performed.

Operation

With reference to FIGS. 1A to 1D, the operation of the present invention is next described. FIGS. 1A to 1D each show a section of a film with a coating layer, the film including a coating layer 10 and a support 20, and a refractive index distribution in that section. The refractive index distribution is represented in a refractive index distribution graph 30. In the refractive index distribution graph 30, the horizontal axis (X axis) represents a refractive index, and the vertical axis (Y axis) represents a corresponding position in the section of the coating layer 10 and the support 20.

FIG. 1A shows a refractive index distribution of the section of the film with a coating layer immediately after the application process. As shown in FIG. 1A, the refractive index of the section of the film with a coating layer changes in a stepwise fashion, and the refractive index abruptly changes at the interface between the coating layer 10 and the support 20.

FIG. 1C shows a refractive index distribution of the section of the film with a coating layer after a lapse of approximately one to three seconds after the application process. As shown in FIG. 1C, with the solvent in the coating layer 10 permeating through the support 20, an intermediate layer 40 begins to be formed on an upper portion of the support 20. However, the interface between the intermediate layer 40 and the support 20, and the interface between the intermediate layer 40 and the coating layer 10 as a hard coat layer are clear, and the refractive index distribution changes in a stepwise fashion.

In the state shown in FIG. 1C, by irradiating the coating layer 10 and the intermediate layer 40 with the actinic ray in the irradiation process, the actinic-ray curable monomer and the actinic-ray curable resin are cured as shown in FIG. 1B, and the state in which a gently-sloped refractive index distribution is kept can be formed.

If the state is let stand for a while from the state shown in FIG. 1A without actinic-ray irradiation, the state becomes such that the thickness of the intermediate layer 40 is increased as shown in FIG. 1C, causing reflection of light to occur at the interface between the coating layer 10 and the intermediate layer 40, and the interface between the intermediate layer 40 and the support 20. Owing to this reflection, interference fringe occurs.

Figure 2A:
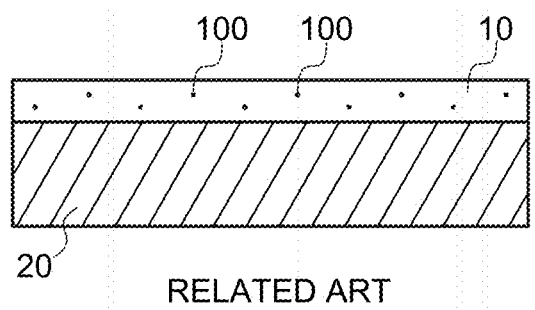
FIGS. 2A and 2B are explanatory diagrams for describing the state of an actinic-ray curable monomer and an actinic-ray curable resin in the coating layer.
Figure 2B:
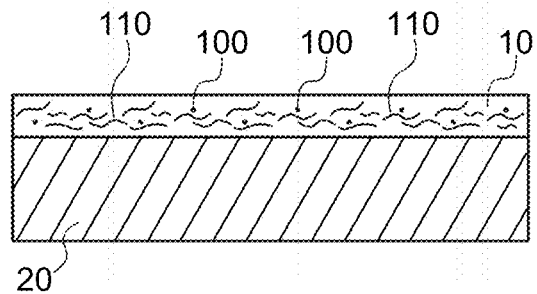

Next, description is further made with reference to FIGS. 2A and 2B. FIGS. 2A and 2B are explanatory diagrams for describing the state of an actinic-ray curable monomer and an actinic-ray curable resin in the coating layer. FIG. 2A is a diagram showing the state in which only actinic-ray curable monomers 100 are present. That is, FIG. 2A shows the state in the conventional technology in which a coating liquid containing only an active-ray curable resin is applied onto the support.

As shown in FIG. 2A, each of the actinic-ray curable monomer 100 is a monomer, and therefore has a short molecular chain.

For this reason, if the coating liquid is applied with a film-formable concentration, owing to the presence of the solvent, the active-ray curable monomers 100 are separately present in the solvent. Crosslinking points are physically away from each other, and therefore polymerization cannot be achieved even if irradiation with an actinic ray is performed to activate the actinic-ray curable monomers. That is, the coating layer is not cured.

Even so, if the concentration of the actinic-ray curable monomers 100 is increased to put the crosslinking points closer to each other, the viscosity of the coating liquid is increased too much, thereby making it difficult to apply the coating liquid.

FIG. 2B shows the state in which a coating liquid containing actinic-ray curable resins 110 is applied onto the support. As can be seen from FIG. 2B, even if the concentration is low, since the actinic-ray curable resin has long molecules, it can make contact with a crosslinking point of another actinic-ray curable resin 110 or a crosslinking point of the actinic-ray curable monomer 100. For this reason, by irradiation with an actinic ray, polymerization can be reliably performed with the actinic-ray curable resin 110 and the actinic-ray curable monomer 110, thereby making it possible to cure the coating layer.

As has been described above, it can be found in the present invention that the same mechanism works irrespectively of the type of the actinic ray for curing the actinic-ray curable resin or the actinic-ray curable monomer or irrespectively of the type of the actinic-ray curable resin or the actinic-ray curable monomer itself.

Note that the technical idea of the present invention includes that wet-on-wet coating of a solution containing an actinic-ray curable monomer is applied to an upper layer, wet-on-wet coating of a base-material permeable solution containing at least an actinic-ray curable resin having a molecular weight of 2500 or more is applied to a lower layer, and an irradiation with an actinic ray is performed before solvent/hard coat components of the lower layer permeate into a base material too much (which is included in "a preparing step of preparing a coating liquid containing a solvent, an actinic-ray curable monomer, and an actinic-ray curable resin, an applying step of applying the coating liquid onto a support into which the solvent can permeate or can be dissolved to form a coating layer"). Here, "wet-on-wet coating" means that a plurality of coating liquids are applied to form coating layers s are wet (while the coating layer applied the first is wet, another coating liquid is applied).

Experiment 1

Evaluations

Next, details of evaluations and evaluation results regarding the method of manufacturing a film with a coating layer according to the present invention are described. Samples for evaluation were manufactured by using an extrusion-type coating apparatus to apply a coating liquid containing an actinic-ray curable resin onto a support under certain conditions to form a coating layer and by irradiating the formed coating layer with an ultraviolet ray (UV). In the evaluations, a UV curable resin was used as an actinic-ray curable resin, and a UV curable monomer was used as an actinic-ray curable monomer.

Here, the samples were each manufactured with amounts and ratios of the UV curable resin and the UV curable monomer contained in the coating liquid, and irradiance and amount of irradiation of UV irradiation varied. The manufactured samples were evaluated regarding interference fringe and clarity of the interface between the support and the coating layer.

(1) Preparation of Support

As a support, a triacetyl cellulose film (TAC-TD80U (trademark) manufactured by FUJIFILM Corporation and having a thickness of 80 μm) was prepared.

(2) Preparation of Coating Liquid

A coating liquid having the following composition was prepared. The samples were prepared with the concentrations of the UV curable monomer and the UV curable resin varied as follows. The evaluations were made also with the molecular weight of the UV curable resin varied.

| | |
|---|---|
| Solvent (methyl ethyl ketone:metyl acetate = 1:1 mixed solution) | 12 to 72 weight percent |
| UV curable monomer (PET-30 (trademark) manufactured by NIPPON KAYAKU Co., Ltd.) | 5.5 to 49.5 weight percent |
| UV curable resin (urethane aclate) | 0 to 49.5 weight percent |
| Polymerization initiator (Irgacure 369 (trademark) manufactured by BASF) | 3.0 weight percent |

(3) Fabrication of Samples

By using an extrusion-type die coater, the prepared coating liquid was applied onto the support. The application of the coating liquid was performed while the support was being conveyed at a conveyance speed of 30 m/min.

UV irradiation was performed in a moist state in which 10 weight percent or more of the solvent was contained in the coating layer and with the UV irradiance varied in a range of 5 to 500 mW/cm$^2$ and the amount of UV irradiation varied in a range of 5 to 100 mJ/cm$^2$. For UV irradiation, a UV irradiation apparatus using LED (OX224 (trademark) manufactured by Sen-Tec Corporation) was used.

(4) Sample Evaluations

As sample evaluations, visual inspections regarding interference fringe and inspections regarding clarity of the interface between the support and the coating layer were performed.

Visual Inspections Regarding Interference Fringe

With a black paint being applied to a backside of the manufactured film with a coating layer, the film with the coating layer was visually observed from a side where the coating layer was formed to inspect the presence or absence of interference fringe.

Inspections Regarding Clarity of the Interface

A section vertical to the surface of the coating layer of the manufactured film with a coating layer was magnified by a TEM (transmission electron microscope) by five thousand times for observation.

The inspection results are represented by excellent, good, or poor as follows.

Interference fringe was not observed, and the interface between the coating layer and the support was not clear and was totally blurred in the TEM inspection . . . excellent Interference fringe was not observed, or, even if observed, its level does not pose a problem as an optical film product, and the interface between the coating layer and the support was not clear and blurred although not completely blurred . . . good Interference fringe at a level not negligible as an optical film product was observed or the interface between the coating layer and the support is clear, or both . . . poor (5) Evaluation Results The evaluation results are shown in the following. In the following table, the concentration of solid contents (solid content concentration), the concentration of the UV curable monomer, and the concentration of the UV curable resin are all in units of weight percent. Also, the concentration of the UV curable monomer and the concentration of the UV curable resin both represent the concentration of solid contents. Therefore, the concentration of the UV curable monomer+the concentration of the UV curable resin+the concentration of the polymerization initiator=the concentration of solid contents.

Explanation is made with reference to Table 1. In comparison among examples 1-1 to 1-3 and comparative example 1-1, the concentration of solid contents, the UV irradiance, and the amount of UV irradiation are the same, and only the concentration of the UV curable resin and the concentration of the UV curable monomer are different. In the comparative example 1-1, the concentration of the UV curable resin is 0, that is, no UV curable resin is contained in the coating liquid, and the evaluation result is "poor". By contrast, in examples 1-1 to 1-3, the UV curable resin is contained, with a varied concentration for each sample and, accordingly (since the concentration of solid contents is constant), with a varied concentration of the UV curable monomer contained for each sample, and each evaluation result is excellent or good.

From the above, it can be found that with a certain amount or more of the UV curable resin having a long molecular chain being contained in the coating liquid, the refractive indexes from the coating layer to the intermediate layer and then to the support can be gently changed, thereby significantly weakening interference fringe.

Next, in comparison among examples 1-4 to 1-6 and comparative example 1-2, the conditions other than the concentration of solid contents (and the concentration of the UV curable resin and the concentration of the UV curable monomer configuring the concentration of solid contents) are all the same, and the evaluation result is excellent in each of examples 1-4 to 1-6, and the evaluation result is not good in comparative example 1-2.

Here, the total concentration of the UV curable resin concentration and the UV curable monomer concentration in examples 1-4 to 1-6 are 85 weight percent to 30 weight percent, and the total concentration of the UV curable resin concentration and the UV curable monomer concentration in comparative example 1-2 is 25 weight percent. When the solvent concentration is too high, the crosslinking points are too far away from each other even if an actinic-ray resin

TABLE 1

| | SOLID CONTENT CONCENTRATION (wt %) | CONCENTRATION OF UV CURABLE MONOMER (wt %) | CONCENTRATION OF UV CURABLE RESIN (wt %) | MOLECULAR WEIGHT OF UV CURABLE RESIN | UV IRRADIANCE (mW/cm$^2$) | AMOUNT OF UV IRRADIATION (mJ/cm$^2$) | EVALUATION RESULT |
|---|---|---|---|---|---|---|---|
| EXAMPLE 1-1 | 58 | 5.5 | 49.5 | 10000 | 500 | 100 | EXCELLENT |
| EXAMPLE 1-2 | 58 | 27.5 | 27.5 | 10000 | 500 | 100 | EXCELLENT |
| EXAMPLE 1-3 | 58 | 49.5 | 5.5 | 10000 | 500 | 100 | GOOD |
| EXAMPLE 1-4 | 88 | 42.5 | 42.5 | 10000 | 500 | 100 | EXCELLENT |
| EXAMPLE 1-5 | 58 | 27.5 | 27.5 | 10000 | 500 | 100 | EXCELLENT |
| EXAMPLE 1-6 | 33 | 15 | 15 | 10000 | 500 | 100 | EXCELLENT |
| EXAMPLE 1-7 | 58 | 27.5 | 27.5 | 5000 | 500 | 100 | EXCELLENT |
| EXAMPLE 1-8 | 58 | 27.5 | 27.5 | 2500 | 500 | 100 | GOOD |
| EXAMPLE 1-9 | 58 | 27.5 | 27.5 | 10000 | 100 | 100 | EXCELLENT |
| EXAMPLE 1-10 | 58 | 27.5 | 27.5 | 10000 | 10 | 100 | GOOD |
| EXAMPLE 1-11 | 58 | 49.5 | 5.5 | 10000 | 100 | 30 | EXCELLENT |
| EXAMPLE 1-12 | 58 | 27.5 | 27.5 | 10000 | 100 | 10 | GOOD |
| EXAMPLE 1-13 | 33 | 27 | 3 | 2500 | 10 | 10 | GOOD |
| COMPARATIVE EXAMPLE 1-1 | 58 | 55 | 0 | — | 500 | 100 | POOR |
| COMPARATIVE EXAMPLE 1-2 | 28 | 12.5 | 12.5 | 10000 | 500 | 100 | POOR |
| COMPARATIVE EXAMPLE 1-3 | 58 | 27.5 | 27.5 | 1000 | 500 | 100 | POOR |
| COMPARATIVE EXAMPLE 1-4 | 58 | 27.5 | 27.5 | 700 | 500 | 100 | POOR |
| COMPARATIVE EXAMPLE 1-5 | 58 | 27.5 | 27.5 | 400 | 500 | 100 | POOR |
| COMPARATIVE EXAMPLE 1-6 | 58 | 27.5 | 27.5 | 10000 | 5 | 100 | POOR |
| COMPARATIVE EXAMPLE 1-7 | 58 | 27.5 | 27.5 | 10000 | 500 | 5 | POOR | having a long molecular chain is mixed in the coating liquid, and a curing reaction does not proceed.

Next, in comparison among examples 1-7 to 1-8 and comparative examples 1-3 to 1-5, only the molecular weight of the UV resin is different. Other than that, the same conditions are applied. The evaluation results in examples 1-7 to 1-8 are excellent and good, respectively, but the evaluation results in comparative examples 1-3 to 1-5 are not good. The molecular weights of the UV curable resin in examples 1-7 to 1-8 are 5000 and 2500, respectively, and the molecular weights of the UV curable resin in comparative examples 1-3 to 1-5 are 1000, 700, and 400, respectively. It can be found that a UV curable resin having a molecular chain equal to or longer than a certain degree (as a guide, having a molecular weight of 2500 or more) is required to be contained in the coating liquid.

Examples 1-9 to 1-12 and comparative examples 1-6 to 1-7 are experimental examples with the amount of UV irradiation and the UV irradiance varied. If the amount of UV irradiation and the UV irradiance are too low, curing does not sufficiently proceed. If curing does not proceed, the results are the same as in the conventional technology. Although not necessarily clearly shown in Table 1, from the evaluations, it was found that curing proceeds more with a larger UV irradiance if the amount of UV irradiation is the same.

Furthermore, it was found that if the UV irradiance is less than a certain amount, curing does not proceed however larger the amount of UV irradiation is. That is, curing does not proceed when UV irradiation is performed with weak irradiance for a long period. As a result of diligent studies by the inventors, it was found that, as shown in Table 1, curing proceeds with an irradiance of 10 mW/cm$^2$ or more but curing does not proceed with an irradiance smaller than 10 mW/cm$^2$.

For these amount of UV irradiation and UV irradiance, as an energy amount and an energy strength of the actinic ray for use, a range in which the effect of the present invention can be achieved can be selected according to the types of the actinic-ray curable resin and the actinic-ray curable monomer for use.

Also, with reference to example 1-13, it was found that the evaluation result is good even under the conditions with the lowest values of the respective parameters evaluated in examples 1-1 to 1-12, that is, the total concentration of the UV curable resin concentration and the UV curable monomer concentration of 30 weight percent, a concentration of the UV curable resin of 3 weight percent, a molecular weight of the UV curable resin of 2500, a UV irradiance of 10 mW/cm$^2$, and an amount of UV irradiation of 10 mJ/cm$^2$. From this, the evaluation result is good or excellent if the values of these respective parameter are all equal to or more than the values shown in example 1-13, reflection of light at the interface between the coating layer and the support is significantly weakened and, as a result, a high-quality support with a coating layer having significantly weak interference fringe can be manufactured.

Here, from further evaluations, the inventors found the following perception regarding the molecular weight of the UV curable resin contained in the coating liquid. That is, the UV curable resin contained in the coating liquid may be a UV curable resin having one type of molecular weight or UV curable resins of a plurality of types with different molecular weights.

Also when a UV curable resin having a molecular weight of hundred thousand or more is contained in the coating liquid, it is required that a UV curable resin having a molecular weight smaller than hundred thousand is also contained. In this case, when the UV curable resin having the molecular weight of hundred thousand or more has a concentration of solid contents of A weight percent in the coating liquid and the UV curable resin having the molecular weight smaller than hundred thousand has a concentration of solid contents of B weight percent in the coating liquid, it is required that B>A≥0 is satisfied, preferably 0.1B>A≥0, and most preferably 0.01B>A≥0.

The reasons found for this are as follows. Firstly, since a UV curable resin having a molecular weight of 2500 or more and smaller than hundred thousand has an appropriately low molecular weight and low viscosity to easily permeate into the base material, UV irradiation in a solvent-rich state increases the viscosity as appropriate and stops permeation as appropriate.

Secondly, the UV curable resin having a molecular weight of hundred thousand and more takes a more amount of the solvent into the polymer at the time of polymerization, and therefore a free solvent becomes less and the liquid viscosity near the base material is increased to make permeation less prone to proceed.

Experiment 2

Evaluations

Details of evaluations and evaluation results regarding the method of manufacturing a film with a coating layer according to the present invention are described. Samples for evaluation were manufactured by using an extrusion-type coating apparatus to apply a coating liquid containing an actinic-ray curable resin onto a support under certain conditions to form a coating layer and by irradiating the formed coating layer with an ultraviolet ray (UV). In the evaluations, a UV curable resin was used as an actinic-ray curable resin, and a UV curable monomer was used as an actinic-ray curable monomer.

Here, the samples were each manufactured with amounts and ratios of the UV curable resin and the UV curable monomer contained in the coating liquid, and irradiance and amount of UV irradiation varied. The manufactured samples were evaluated regarding interference fringe and clarity of the interface between the support and the coating layer.

(1) Preparation of Support

As a support, a triacetyl cellulose film (TAC-TD80U (trademark) manufactured by FUJIFILM Corporation and having a thickness of 80 μm) was prepared.

(2) Preparation of Coating Liquid

A coating liquid having the following composition was prepared. The samples were prepared with the concentrations of the UV curable monomer and the UV curable resin as below.

| | |
|---|---:|
| Solvent (methyl ethyl ketone:metyl acetate = 1:1 mixed solution) | 42 weight percent |
| UV curable monomer (PET-30 (trademark) manufactured by NIPPON KAYAKU Co., Ltd.) | 27.5 weight percent |
| UV curable resin (urethane aclate: molecular weight of 2500) | 27.5 weight percent |
| Polymerization initiator (Irgacure 369 (trademark) manufactured by BASF) | 3.0 weight percent |

(3) Fabrication of Samples

By using an extrusion-type die coater, the prepared coating liquid was applied onto the support. The application of the coating liquid was performed while the support was being conveyed at a conveyance speed of 30 m/min.

The UV irradiation was performed in a moist state in which 10 weight percent or more of the solvent was contained in the coating layer and with the UV irradiance varied in a range of 10 to 1000 mW/cm$^2$ and the amount of UV irradiation varied in a range of 10 to 500 mJ/cm$^2$. For UV irradiation, in comparative examples, a mercury lamp (air-cooled type (120 W/cm) manufactured by Eye Graphics Co., Ltd.) and a metal halide lamp (air-cooled type (120 W/cm) manufactured by Eye Graphics Co., Ltd.) were used. In examples, a UV irradiation apparatus using LED (OX224 (trademark) manufactured by Sen-Tec Corporation) was used. Here, the irradiance and amount of irradiation are measurement value at a wavelength of 365 nm.

(4) Sample Evaluations

As sample evaluations, visual inspections regarding presence/absence of curing wrinkles were performed.

(5) Evaluation Results

The evaluation results are shown in the following. In the following table, the solvent concentration (i.e., solvent weight/(solvent weight+solid content weight)) at the time of UV irradiation is shown in unit of weight percent.

TABLE 2

| | LAMP TYPE | SOLVENT CONCENTRATION AT UV IRRADIATION (wt %) | UV IRRADIANCE (mW/cm$^2$) | AMOUNT OF UV IRRADIATION (mJ/cm$^2$) | WITH OR WITHOUT OF BACKUP ROLL | CURING WRINKLES |
|---|---|---|---|---|---|---|
| EXAMPLE 2-1 | LED | 90 | 500 | 100 | WITH | NONE |
| EXAMPLE 2-2 | LED | 45 | 500 | 100 | WITH | NONE |
| EXAMPLE 2-3 | LED | 15 | 500 | 100 | WITH | NONE |
| EXAMPLE 2-4 | LED | 45 | 10 | 100 | WITH | NONE |
| EXAMPLE 2-5 | LED | 45 | 100 | 100 | WITH | NONE |
| EXAMPLE 2-6 | LED | 45 | 1000 | 100 | WITH | NONE |
| EXAMPLE 2-7 | LED | 45 | 100 | 10 | WITH | NONE |
| EXAMPLE 2-8 | LED | 45 | 100 | 50 | WITH | NONE |
| EXAMPLE 2-9 | LED | 45 | 100 | 100 | WITH | NONE |
| EXAMPLE 2-10 | LED | 45 | 100 | 500 | WITH | NONE |
| EXAMPLE 2-11 | LED | 45 | 500 | 100 | WITHOUT | NONE |
| EXAMPLE 2-12 | LED | 45 | 500 | 100 | WITHOUT | NONE |
| EXAMPLE 2-13 | LED | 45 | 500 | 100 | WITHOUT | NONE |
| EXAMPLE 2-14 | LED | 45 | 500 | 100 | WITHOUT | NONE |
| EXAMPLE 2-15 | LED | 45 | 10 | 100 | WITHOUT | NONE |
| EXAMPLE 2-16 | LED | 45 | 100 | 100 | WITHOUT | NONE |
| EXAMPLE 2-17 | LED | 45 | 1000 | 100 | WITHOUT | NONE |
| EXAMPLE 2-18 | LED | 45 | 100 | 10 | WITHOUT | NONE |
| EXAMPLE 2-19 | LED | 45 | 100 | 50 | WITHOUT | NONE |
| EXAMPLE 2-20 | LED | 45 | 100 | 100 | WITHOUT | NONE |
| EXAMPLE 2-21 | LED | 45 | 100 | 500 | WITHOUT | NONE |
| COMPARATIVE EXAMPLE 2-1 | MERCURY/METAL HALIDE | 90 | 500 | 100 | WITH | PRESENT |
| COMPARATIVE EXAMPLE 2-2 | MERCURY/METAL HALIDE | 45 | 500 | 100 | WITH | PRESENT |
| COMPARATIVE EXAMPLE 2-3 | MERCURY/METAL HALIDE | 15 | 500 | 100 | WITH | PRESENT |
| COMPARATIVE EXAMPLE 2-4 | MERCURY/METAL HALIDE | 45 | 10 | 100 | WITH | PRESENT |
| COMPARATIVE EXAMPLE 2-5 | MERCURY/METAL HALIDE | 45 | 100 | 100 | WITH | PRESENT |
| COMPARATIVE EXAMPLE 2-6 | MERCURY/METAL HALIDE | 45 | 1000 | 100 | WITH | PRESENT |
| COMPARATIVE EXAMPLE 2-7 | MERCURY/METAL HALIDE | 45 | 100 | 10 | WITH | PRESENT |
| COMPARATIVE EXAMPLE 2-8 | MERCURY/METAL HALIDE | 55 | 100 | 50 | WITH | PRESENT |
| COMPARATIVE EXAMPLE 2-9 | MERCURY/METAL HALIDE | 55 | 100 | 100 | WITH | PRESENT |
| COMPARATIVE EXAMPLE 2-10 | MERCURY/METAL HALIDE | 55 | 100 | 500 | WITH | PRESENT |
| COMPARATIVE EXAMPLE 2-11 | MERCURY/METAL HALIDE | 55 | 500 | 100 | WITHOUT | PRESENT |
| COMPARATIVE EXAMPLE 2-12 | MERCURY/METAL HALIDE | 55 | 500 | 100 | WITHOUT | PRESENT |
| COMPARATIVE EXAMPLE 2-13 | MERCURY/METAL HALIDE | 55 | 500 | 100 | WITHOUT | PRESENT |
| COMPARATIVE EXAMPLE 2-14 | MERCURY/METAL HALIDE | 55 | 500 | 100 | WITHOUT | PRESENT |

TABLE 2-continued

| | LAMP TYPE | SOLVENT CONCENTRATION AT UV IRRADIATION (wt %) | UV IRRADIANCE (mW/cm²) | AMOUNT OF UV IRRADIATION (mJ/cm²) | WITH OR WITHOUT OF BACKUP ROLL | CURING WRINKLES |
|---|---|---|---|---|---|---|
| COMPARATIVE EXAMPLE 2-15 | MERCURY/ METAL HALIDE | 55 | 10 | 100 | WITHOUT | PRESENT |
| COMPARATIVE EXAMPLE 2-16 | MERCURY/ METAL HALIDE | 55 | 100 | 100 | WITHOUT | PRESENT |
| COMPARATIVE EXAMPLE 2-17 | MERCURY/ METAL HALIDE | 55 | 1000 | 100 | WITHOUT | PRESENT |
| COMPARATIVE EXAMPLE 2-18 | MERCURY/ METAL HALIDE | 55 | 100 | 10 | WITHOUT | PRESENT |
| COMPARATIVE EXAMPLE 2-19 | MERCURY/ METAL HALIDE | 55 | 100 | 50 | WITHOUT | PRESENT |
| COMPARATIVE EXAMPLE 2-20 | MERCURY/ METAL HALIDE | 55 | 100 | 100 | WITHOUT | PRESENT |
| COMPARATIVE EXAMPLE 2-21 | MERCURY/ METAL HALIDE | 55 | 100 | 500 | WITHOUT | PRESENT |

As can be understood from Table 2, the curing wrinkles could be prevented by irradiating the coated layer with a UV light of the LED light source as an actinic-ray in a state where the coating layer contains the solvent of 10 weight percent or more Experiment 3

Next, details of evaluations regarding a change of curing efficiency according differences in molar absorption efficiency of polymerization initiators are described. This evaluation was performed by using coating liquids in which only the type of polymerization initiators was changed and the others were the same as the experiments 1 and 2.

The curing efficiency was evaluated as "excellent" when the coating layer was curable with a light quantity (amount of light) of 10 to 20 mJ/cm² or less, "good" when the coating layer was curable with a light quantity of 20 to 30 mJ/cm² or less, and "fair" when the coating layer was curable with a light quantity of more than 30 mJ/cm².

The absorption coefficient (1/(mol·cm)) of a light having a wavelength of 365 nm for each polymerization initiator are as below.

Irgacure 184: 50
Irgacure 819: 1200
Irgacure 2959: 0
Irgacure 369: 3400

Evaluation results are shown below.

TABLE 3

| | ADDITION OF INITIATOR HAVING ABSORPTION COEFFICIENT OF 500 OR MORE AT WAVELENGTH OF LED-UV LIGHT SOURCE | CURING EFFICIENCY |
|---|---|---|
| SAMPLE 1 | PRESENT (IRGACURE 184, 369) | EXCELLENT |
| SAMPLE 2 | PRESENT (IRGACURE 184, 819) | GOOD |
| SAMPLE 3 | PRESENT (IRGACURE 184) | FAIR |

As shown in the evaluation results above, the curing efficiency is improved when at least one of the photopolymerization initiators have a molar absorption coefficient of 500 or more (l/(mol·cm)) at a wavelength of LED-UV light source.

Note that the method of manufacturing a film with a coating layer of the present invention can be applied to a variety of fields. For example, if an anti-reflection film is formed on the surface of the film with a coating layer manufactured by the method of the present invention, the coating layer according to the present invention can be used as a hard coat layer, and therefore an anti-reflection film with an anti-abrasion property and without interference fringe can be formed. In addition, by forming a necessary functional layer on the surface of the coating layer according to the present invention, a functional film or an optical film without interference fringe owing to reflection of light at the interface between the coating layer and the support can be manufactured. In addition, it is possible to manufacture a functional film and an optical film which have no curing wrinkles on the coating layer.

What is claimed is:

1. A method of manufacturing a film with a coating layer comprising:
    preparing a coating liquid containing one or more photopolymerization initiator, a solvent, an actinic-ray curable monomer, and an actinic-ray curable resin having one or more types of molecular weights;
    applying the coating liquid onto a support into which the solvent can permeate or can be dissolved to form a coating layer; and
    irradiating the coating layer with an actinic-ray having a wavelength of 365 nm,
    wherein
    the actinic-ray curable resin has a molecular weight of 2500 or more, and the actinic-ray curable resin has a solid content concentration of 3 weight percent or more in the coating liquid,
    a solid content concentration of total solid content of the solid content in the actinic-ray curable resin and solid content in the actinic-ray curable monomer is 30 weight percent or more in the coating liquid, and in the irradiation step, the coating layer is irradiated with the actinic-ray in a state where the coating layer contains the solvent of 10 weight percent or more.

2. A method of manufacturing a film with a coating layer comprising:
preparing a coating liquid containing one or more photopolymerization initiator, a solvent, an actinic-ray curable monomer, and an actinic-ray curable resin having one or more types of molecular weights;
applying the coating liquid onto a support into which the solvent can permeate or can be dissolved to form a coating layer; and
irradiating the coating layer with an ultraviolet light emitted from a light-emitting diode as an actinic-ray, wherein the wavelength of the actinic-ray is 365 nm,
wherein, in the irradiation step, the coating layer is irradiated with the actinic-ray in a state where the coating layer contains the solvent of 10 weight percent or more.

3. The method of manufacturing the film with a coating layer according to claim 1, wherein
the actinic-ray is an ultraviolet light having a wavelength of 365 nm, and
at least one of the one or more photopolymerization initiators have a molar absorption coefficient of 500 (l/(mol·cm)) or more at a wavelength of the ultraviolet light.

4. The method of manufacturing the film with a coating layer according to claim 2, wherein
the actinic-ray is an ultraviolet light having a wavelength of 365 nm, and
at least one of the one or more photopolymerization initiators have a molar absorption coefficient of 500 (l/(mol·cm)) or more at a wavelength of the ultraviolet light.

5. The method of manufacturing the film with a coating layer according to claim 1, wherein, in the irradiation step, the coating layer is irradiated with UV light having an irradiance of 10 mW/cm$^2$ or more and an amount of irradiation of 10 mJ/cm$^2$ or more, as the actinic ray.

6. The method of manufacturing the film with a coating layer according to claim 2, wherein, in the irradiation step, the coating layer is irradiated with UV light having an irradiance of 10 mW/cm$^2$ or more and an amount of irradiation of 10 mJ/cm$^2$ or more, as the actinic ray.

7. The method of manufacturing the film with a coating layer according to claim 1, wherein, among the one or more types of actinic-ray curable resins, when an actinic-ray curable resin having a molecular weight of 100,000 or more has a solid content concentration of a weight percent A in the coating liquid and an actinic-ray curable resin having a molecular weight smaller than hundred thousand has a solid content concentration of a weight percent B in the coating liquid, $B > A \geq 0$.

* * * * *